United States Patent
De Wergifosse

(10) Patent No.: US 10,784,802 B2
(45) Date of Patent: Sep. 22, 2020

(54) GENERATOR STARTER OF A TURBOMACHINE WITH ASYNCHRONOUS MULTI-WINDING ELECTRIC MACHINE

(71) Applicant: SAFRAN ELECTRICAL & POWER, Blagnac (FR)

(72) Inventor: Eric De Wergifosse, Saint Augustin (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/768,666

(22) PCT Filed: Oct. 18, 2016

(86) PCT No.: PCT/FR2016/052684
§ 371 (c)(1),
(2) Date: Apr. 16, 2018

(87) PCT Pub. No.: WO2017/068274
PCT Pub. Date: Apr. 27, 2017

(65) Prior Publication Data
US 2018/0309397 A1    Oct. 25, 2018

(30) Foreign Application Priority Data

Oct. 20, 2015   (FR) ...................... 15 59978

(51) Int. Cl.
*H02P 9/00* (2006.01)
*H02P 1/26* (2006.01)
(Continued)

(52) U.S. Cl.
CPC .............. *H02P 9/006* (2013.01); *F02N 11/04* (2013.01); *H02K 17/42* (2013.01); *H02P 1/26* (2013.01); *H02P 9/00* (2013.01); *H02P 2101/30* (2015.01)

(58) Field of Classification Search
CPC . F02N 11/04; H02K 17/42; H02P 1/26; H02P 9/00; H02P 9/006
See application file for complete search history.

(56) References Cited

U.S. PATENT DOCUMENTS 5,182,508 A     1/1993  Schauder
5,587,647 A *  12/1996  Bansal .................... F02N 11/04
                                                                   290/31
(Continued)

OTHER PUBLICATIONS

International Search Report dated Mar. 2, 2017 in PCT/FR2016/052684 filed Oct. 18, 2016.
(Continued)

*Primary Examiner* — Sean Gugger
(74) *Attorney, Agent, or Firm* — Oblon, McClelland, Maier & Neustadt, L.L.P.

(57) ABSTRACT

A generator starter of a turbomachine, including an asynchronous electric machine configured so as to operate in motor mode during a starting phase of the turbomachine while being supplied by an electrical source, and so as to operate in generator mode after the starting phase of the turbomachine in order to supply an electrical load. An inverter is arranged between the electrical source and the asynchronous machine with at least two alternating current terminals coupled to the asynchronous machine, and a control unit for the inverter configured to supply the asynchronous machine with a starting current in motor mode and a magnetisation current in generator mode. The asynchronous machine includes at least one first stator winding connected to the alternating current terminals to be supplied with the starting current in motor mode and with the magnetisation current in generator mode, and at least one second stator winding connected to the electrical load in generator mode.

16 Claims, 3 Drawing Sheets

(51) Int. Cl.
*F02N 11/04* (2006.01)
*H02K 17/42* (2006.01)
*H02P 101/30* (2015.01)

(56) References Cited

U.S. PATENT DOCUMENTS

| | | | |
|---|---|---|---|
| 5,929,612 | A | 7/1999 | Eisenhaure et al. |
| 6,462,429 | B1 | 10/2002 | Dhyanchand et al. |
| 8,487,560 | B2 | 7/2013 | De Wergifosse |
| 8,928,293 | B1 * | 1/2015 | Rozman ............... H02P 9/14 290/31 |
| 2002/0047455 | A1 * | 4/2002 | Dhyanchand ........ F02N 11/04 310/211 |
| 2008/0164851 | A1 * | 7/2008 | Ganev ................. H02M 7/493 322/8 |
| 2010/0164428 | A1 | 7/2010 | Xu et al. |

OTHER PUBLICATIONS

Preliminary French Search Report dated Apr. 7, 2016 in French Application 1559978 filed Oct. 20, 2015.

* cited by examiner

GENERATOR STARTER OF A TURBOMACHINE WITH ASYNCHRONOUS MULTI-WINDING ELECTRIC MACHINE

TECHNICAL DOMAIN

The invention relates to the domain of turbomachine starter-generators. Its field of application is more particularly that of starter-generators that can firstly act in motor mode during turbomachine starting phases (for example to start aeronautical gas turbine engines or to start gas turbine Auxiliary Power Units (APU) installed on aircraft), and secondly in generator mode to supply electrical energy to a load or a network on board an aircraft.

STATE OF PRIOR ART

At the present time, most turbomachine starting systems are pneumatic type motors, or electric motors with brushes for smaller turbomachines.

These starting systems have the advantage of simplicity but cannot be used for starting respecting a controlled torque/speed profile. However, the sophistication of turbomachines and the need to increase the number of successful starts make this possibility of controlled starting increasingly necessary.

Furthermore, brush motors are relatively unreliable and the duration between two maintenance operations is only a few hundred hours. It may also be difficult to generate high starting torques and powers with these machines, although this need is becoming increasingly prevalent with new turbomachines.

It may also be advantageous to combine the electric starting function with the electricity generation function for easily understandable reasons of mass, dimension and cost.

As a result of the above, brushless starter-generators are becoming increasing used as an inevitable solution. This is particularly the case because developments in the performances of power electronics and microelectronics are such that this solution that requires control electronics controlling the speed and torque is now competitive.

The most widely used brushless starter-generator solution consists of reusing an AC generator and modifying it so that it can perform the start function in association with the control electronics. These machines, called WFSG (Wound Field Starter Generators) are synchronous type machines with a wound rotor field coil powered by an exciter through a rotating rectifier to avoid the presence of brushes.

The advantage of this type of machine is that it can be used to regulate the generated voltage with very low power, corresponding to the DC current to be injected into the exciter stator (a few amperes). The disadvantage of this type of machine is its complexity that is accompanied by lower reliability, high mass and large dimensions, and high cost.

When the brushless starter-generator has to supply an on-board AC network with strict distortion standards, the WFSG machine is still the best solution.

However, when the network to be powered is a DC type network, or when it is the AC type without any distortion constraint, other less complex machines may be advantageous.

Thus, the synchronous machine with permanent magnets has been widely studied but for the moment is not used for any real applications due to the safety problems that it introduces (risk of fire in case of failure). This problem does not occur with the asynchronous machine that also has the property of having a controllable flux. It is also simple, robust, reliable and inexpensive, and its mass is advantageous for some applications.

Thus, the asynchronous machine appears to be in a good position to advantageously replace WFSG machines for brushless starter-generator needs associated particularly with DC onboard networks.

Thus, U.S. Pat. No. 6,462,429 B1 discloses a starter-generator used on board an aircraft that uses an asynchronous machine equipped with several pieces of stator equipment. More precisely, such a machine comprises a set of stator windings called the principal windings used to exchange active power, and a set of stator windings called auxiliary or excitation windings that output the magnetising current necessary for operation of the machine both in motor mode and in generator mode.

Use of the set of principal windings in motor mode and also in generator mode implies the use of an inverter (for motor mode) and a rectifier (that can only be used in generator mode). Use of the set of auxiliary windings in motor mode and also in generator mode implies the use of an inverter for use in supplying the magnetisation current. The method of controlling the machine also requires the presence of an external source or an auxiliary generator with magnets associated with a rectifier to maintain the magnetisation current. Due to the necessary presence of these various equipments, such a starter-generator has not been found to be satisfactory.

PRESENTATION OF THE INVENTION

The invention relates to the use of an asynchronous machine in a turbomachine starter-generator. In particular, it discloses a solution that is competitive in terms of mass, global efficiency, reliability and cost, and particularly a less complex solution than that disclosed in U.S. Pat. No. 6,462,429 B1.

To achieve this, the invention discloses a turbomachine starter-generator comprising:
  an asynchronous electric machine configured so as to operate in motor mode during a starting phase of the turbomachine while being supplied by an electrical source, and so as to operate in generator mode after the starting phase of the turbomachine in order to supply power to an electrical load.
  a inverter arranged between the electrical source and the asynchronous machine, the inverter having at least two AC terminals coupled to the asynchronous machine and at least two DC terminals coupled to a DC bus,
  characterised in that the asynchronous machine also comprises:
  an inverter control unit configured such that the inverter outputs a starting current in motor mode and a magnetisation current in generator mode, onto the at least two AC terminals coupled to the asynchronous machine;
  at least one first stator winding connected to the alternating current terminals of the inverter in order to be supplied with starting current in motor mode and with magnetisation current in generator mode, and at least one second stator winding connected to the electrical load in generator mode.

Some preferred but non limitative aspects of this starter-generator are as follows:
  the at least one second stator winding is disconnected from the electrical load in motor mode;

it also comprises a converter arranged between the inverter and the electrical source;

the electrical source is an AC source, and the converter is an AC-DC converter;

the converter is a two-directional converter and the electrical source is a rechargeable source to which the asynchronous machine outputs energy through the at least one first stator winding in generator mode;

the electrical load is an on board electrical network;

the electrical load is a DC load and the starter-generator also comprises a rectifier arranged between the at least one second stator winding and the DC load;

the rectifier is integrated into the asynchronous machine;

it also comprises an auxiliary converter configured so as to load the DC bus to initiate the generator mode;

the at least one first stator winding and the at least one second stator winding have a different number of turns;

the at least one second stator winding comprises several sets of windings each comprising at least one stator winding, the sets being out of phase by an electrical angle;

the rotor of the asynchronous machine is of the squirrel cage type;

it comprises an isolation contactor located between the inverter and the electrical source, said isolation contactor being capable of being controlled to disconnect the inverter from the electrical source in generator mode;

the inverter control unit is configured in generator mode such that the inverter supplies the magnetisation current without the need for an external source by being controlled from a voltage measurement at the electrical load and a voltage measurement on the DC bus.

The invention also relates to a turbomachine equipped with a starter-generator according to the invention, and the use of such a starter-generator during a starting phase of a turbomachine and/or for the power supply to an electrical load after the starting phase of the turbomachine and/or to recharge a battery.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED PRESENTATION OF PARTICULAR EMBODIMENTS

Figure 1:
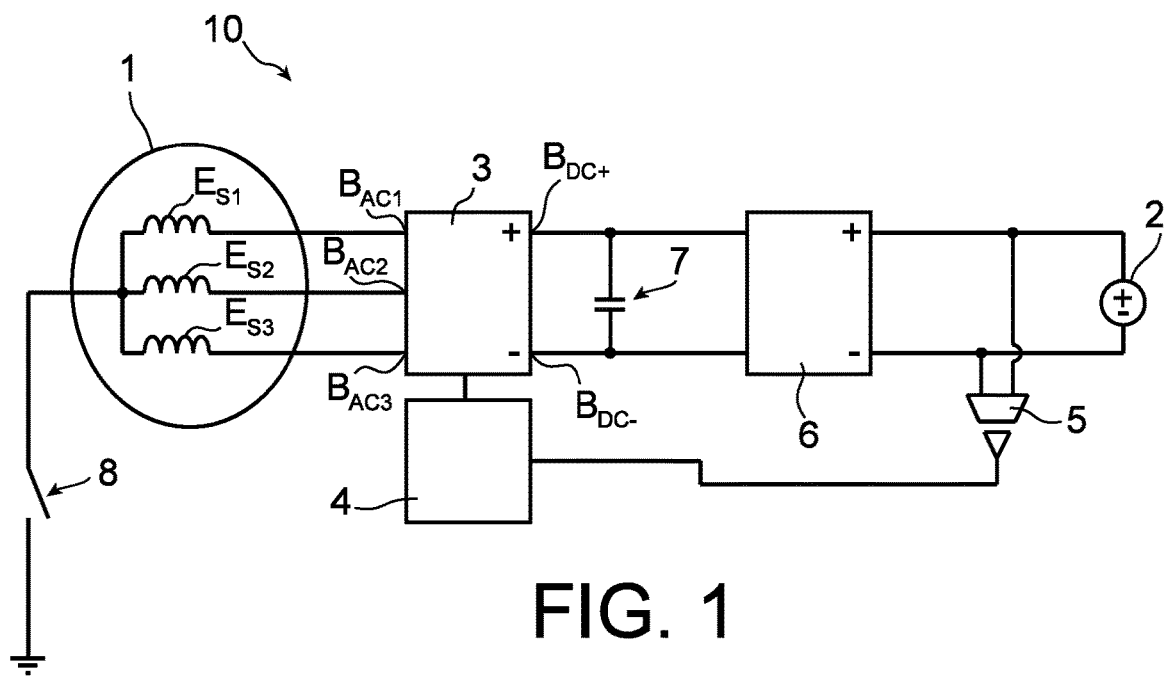
FIGS. 1 and 2 are diagrams representing turbomachine starter-generators using asynchronous brushless machines that cannot achieve the objectives of the invention.

FIG. 1 shows a possible design option for a starter-generator of a turbomachine 10 comprising an asynchronous rotating electric machine 1 configured so as to operate in motor mode during a starting phase of the turbomachine while being supplied by an onboard network 2 (in this case DC), and so as to operate in generator mode after the starting phase of the turbomachine in order to supply the onboard network 2.

The starter-generator of the turbomachine 10 also comprises an inverter 3 arranged between the onboard network 2 and the asynchronous machine 1. The inverter has at least two DC power terminals $B_{DC+}$, $B_{DC-}$ coupled to a DC bus 7 and at least two AC power terminals coupled to the asynchronous machine, and more precisely three AC power terminals $B_{AC1}$, $B_{AC2}$, $B_{AC3}$ in a three-phase version of the starter-generator 10.

The starter-generator of the turbomachine 10 also comprises an inverter control unit 4 configured such that the inverter 3 imposes a good voltage and frequency level on the asynchronous machine 1, in motor mode and also in generator mode. For regulation in generator mode, the control unit 4 is connected to the output of a voltage measurement device 5 arranged to be able to measure the output voltage in generator mode.

The asynchronous machine 1 comprises at least one first stator winding connected to two AC terminals of the inverter, typically a set of three stator windings Es1, Es2 and Es3 in the three-phase version, each of the windings Es1, Es2, Es3 being connected to one of the AC terminals $B_{AC1}$, $B_{AC2}$, $B_{AC3}$ of the inverter 3. In some cases, the at least one stator winding Es1, Es2, Es3 can be connected to the mechanical structure through a neutral contactor 8.

The starter-generator 10 may also include an interface circuit 6 to the onboard network located between the DC bus 7 and the onboard network 2. In generator mode, this circuit is useful to prevent the machine 1 from becoming unprimed during load transients and during short circuits. In the presence of a short circuit, it is required that the generation system should supply a fault current for a sufficiently long time so that protections can be triggered. The interface circuit 6 thus aims to limit the discharge from the internal bus 7 in case of an overload or a transient. The interface circuit 6 may be a Buck-Boost type chopping converter.

It is found that the solution disclosed in U.S. Pat. No. 6,462,429 B1 is less satisfactory than the solution disclosed in FIG. 1. Although it is possible to manage without the interface circuit 6, the solution in the US patent includes an additional inverter and rectifier (inverter to supply the magnetisation current to the set of auxiliary windings and rectifier necessary for generator mode).

In the context of FIG. 1, the onboard network 2 is used for both motor mode and generator mode. However, it is possible that the network (and more generally the electrical source) used for starting can be different from the network (more generally the electrical load) used for generation. The type (AC or DC) or the voltage amplitude can also be different in the starting network and the generation network.

Figure 2:
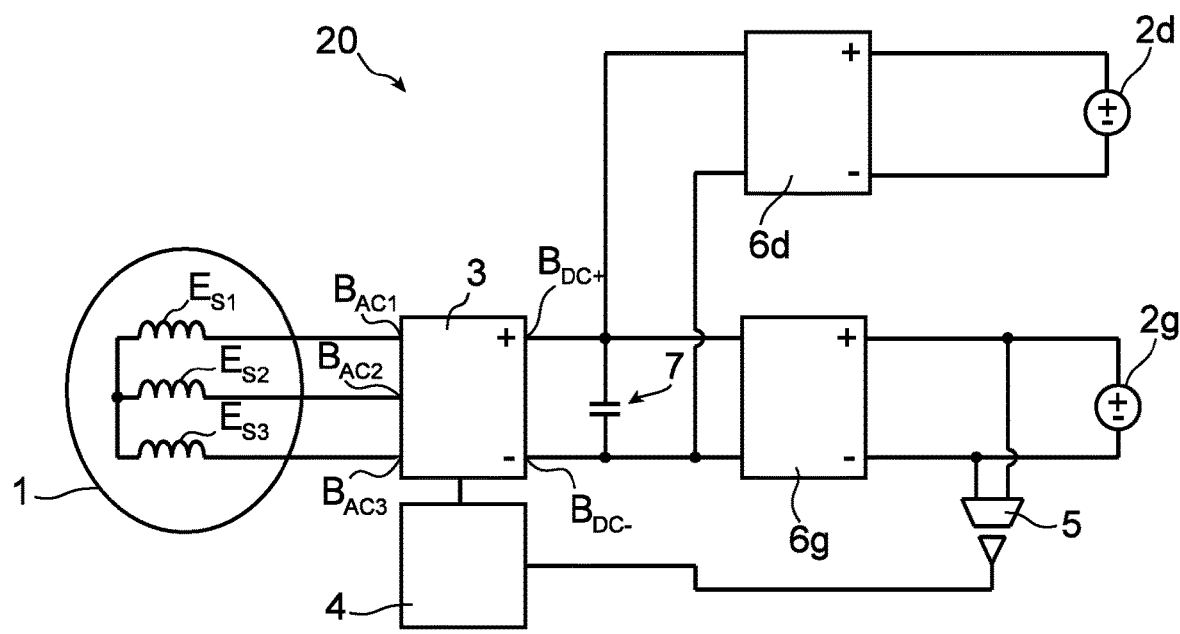

FIG. 2 shows one possible design option for a starter-generator 20 of a turbomachine 10 that can cover this need. On FIG. 2, elements identical to those shown on FIG. 1 have the same references. However, it still includes a first onboard network 2d to supply power to the machine 1 in motor mode (in this case a DC network), the first network 2d being distinct from a second onboard network 2g powered by the machine 1 in generator mode (in this case a DC network).

The starter-generator 20 includes a first converter 6d located between the internal DC bus 7 and the first onboard starting network 2d to adapt the first onboard network 2d to the internal DC bus 7. It comprises a second converter 6g located between the internal DC bus 7 and the second onboard generation network 2g to regulate the voltage supplied to the second network 2g in generator mode.

In most cases, due to reasons of incompatibility between connection points to the mechanical structure or segregation needs between the networks, at least one of the two converters 6d, 6g must have galvanic isolation to prevent the propagation of some defects. This galvanic isolation may also be useful to protect against some failures specific to chopping converters that could lead to overvoltages on onboard networks.

Thus, when the starting and generation networks are different, the advantage of using an asynchronous machine may become debatable because the following needs may arise, depending on the case:

In generation, a network interface circuit is usually required to cover overload and transient cases.

If the power in generation is high, it is necessary to associate an appropriately sized cooling system with an inverter supplying this power level, for permanent dissipation.

At least one converter has to be added to adapt the voltage of the starting network.

If galvanic isolation is required, this must be done by at least one of the converters.

The volumes of the electronic circuit necessary to satisfy these different needs may be such that these solutions based on an asynchronous machine are less competitive in terms of mass, global efficiency, reliability and cost.

It is found that the solution disclosed in U.S. Pat. No. 6,462,429 B1 is also less satisfactory than the solution disclosed in FIG. 2. If the starting network is not the same as the generation network, the solution in the US patent cannot provide the voltage conversion and the galvanic isolation. It would then be necessary to add a converter with isolation, or to insert it to replace the rectifier.

In order to overcome these difficulties, with this invention it is proposed to use the stator magnetic circuit of the asynchronous machine to adapt the voltage for the electrical starting source and the galvanic isolation between the electrical starting source and the electrical generation load. To achieve this, the invention associates an asynchronous machine comprising at least one first stator winding and at least one second stator winding (typically a first set of three-phase windings and a second set of three-phase windings) with an inverter performing the twofold function of controlling the total current in motor mode and controlling only the magnetisation current in generator mode.

On FIGS. 3-6 that illustrate different example embodiments of the invention, elements that perform functions identical to the functions performed by the elements shown on FIGS. 1 and 2 have the same references. With reference to these FIGS. 3-6, the invention relates to a starter-generator of a turbomachine 30, 40, 50, 60 that comprises an asynchronous electric machine 11, 21 configured so as to operate in motor mode during a starting phase of the turbomachine while being supplied by an electrical source 12, 13, 14, and so as to operate in generator mode after the starting phase of the turbomachine in order to supply an electrical load 15, 16.

The starter-generator of the turbomachine 30, 40, 50, 60 comprises an inverter 3 arranged between the electrical source 12, 13, 14 and the asynchronous machine 11, 21. The inverter 3 has at least two alternating current terminals coupled to the asynchronous machine, typically three AC terminals $B_{AC1}$, $B_{AC2}$, $B_{AC3}$ in the three-phase version of the starter generator 11, 21. The inverter 3 also has at least two DC terminals $B_{DC+}$, $B_{DC-}$ coupled to an internal DC bus 7.

The starter generator of the turbomachine 30, 40, 50, 60 also comprises an inverter control unit 4 configured such that the inverter outputs a starting current in motor mode and a magnetisation current in generator mode, onto the at least two AC terminals $B_{AC1}$, $B_{AC2}$, $B_{AC3}$ coupled to the asynchronous machine 11, 21.

The asynchronous machine comprises at least one stator winding A1, A2, A3 connected to at least two alternating current terminals $B_{AC1}$, $B_{AC2}$, $B_{AC3}$ of the inverter 3 in order to be supplied with the starting current in motor mode and with the magnetisation current in generator mode, and at least one second stator winding B1, B2, B3 connected to the electrical load 15, 16 in generator mode.

The number of turns in the at least one first stator winding is adapted as a function of the amplitude of the electrical source voltage used for starting while the number of turns in the at least one second stator winding is adapted as a function of the voltage amplitude to supply the electrical load. The rotor of the machine may be of the squirrel cage type.

In motor mode, the inverter 4, powered by the electrical source 12, 13, 14, controls the asynchronous machine 11, 21 conventionally solely through at least one first stator winding A1, A2, A3. The at least one second stator winding B1, B2, B3 is not used and no current passes through it. The output from at least one second stator winding can be disconnected from the electrical load 15, 16 by means of a first isolation contactor 18 open in motor mode.

In generator mode, the converter 4 supplies only the magnetisation current of the machine 11, 21 through the at least one first stator winding A1, A2, A3. Therefore, ignoring losses, the inverter only outputs reactive power and can be disconnected from the electrical source 12, 13, 14 by means of a second isolation contactor 17 open in generator mode. Losses in the at least one first stator winding A1, A2, A3 and the inverter are compensated by drawing off active power from the machine.

It is possible to manage without an external source to generate this magnetisation current in generation mode due to the use of a specific control law. For example, this law may include firstly measurement of the output voltage in generator mode through the measurement device 5, and secondly the voltage on the DC input to the inverter 3 to balance active and reactive powers of the machine, acting on both the output current amplitude from this inverter and on its frequency.

The at least one second stator winding B1, B2, B3 outputs power to the electrical load 15, 16 (the first isolation contactor 18 being closed), directly at the right voltage amplitude. The control circuit 4 controlling the inverter permanently regulates the voltage output to the electrical load (using the measurement of this voltage by the device 5) by varying the amplitude and the frequency of the magnetisation current.

As shown on FIGS. 3-6, the at least one first stator winding is typically a first set of three-phase windings A1, A2, A3, without this being limitative, the invention including a starter-generator with an arbitrary number of phases. Similarly, the at least one second stator winding is typically a second set of three-phase windings B1, B2, B3 as shown on FIGS. 3 and 4, without this being limitative. In particular, the at least one second stator winding may include a plurality of sets each including at least one stator winding, the phases of the sets being offset by an electrical angle, for example two sets of three-phase windings B11, B12, B13; B21, B22, B23 being offset by 30° as shown on FIGS. 5 and 6. The use of several sets can minimise voltage ripple after rectification.

Figure 3:
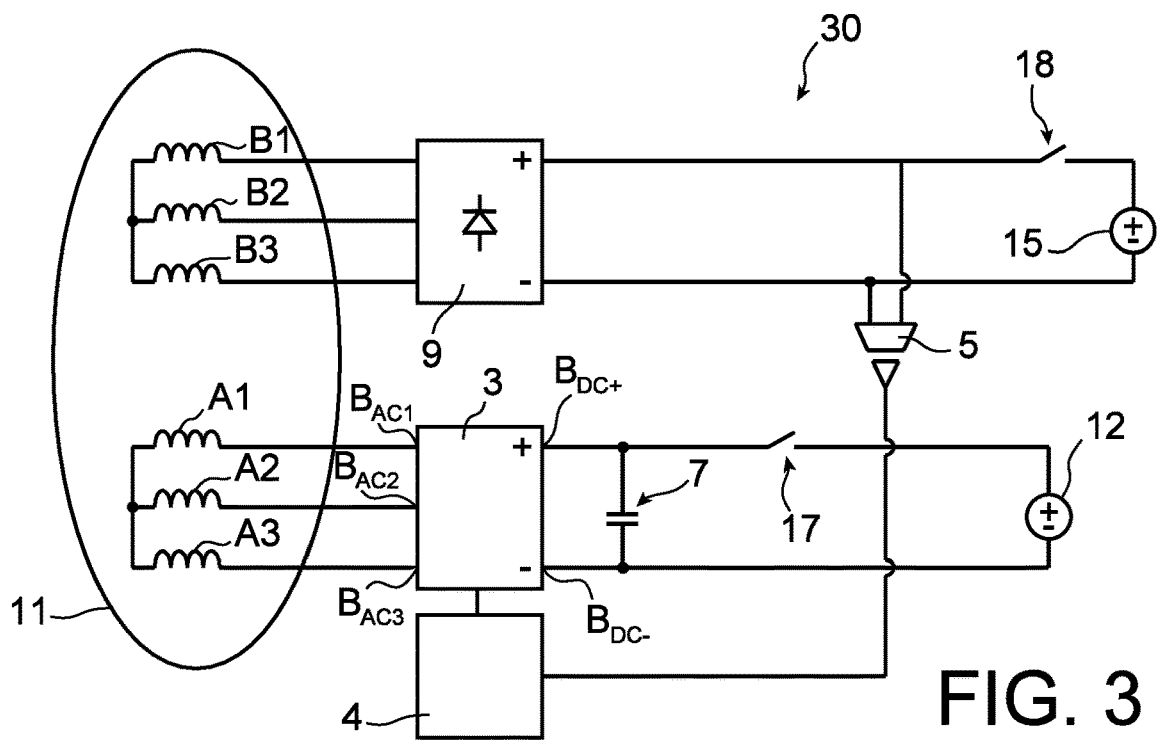
FIGS. 3 to 6 are diagrams representing turbomachine starter-generators using asynchronous brushless machines conforming with different possible embodiments of the invention.
Figure 4:
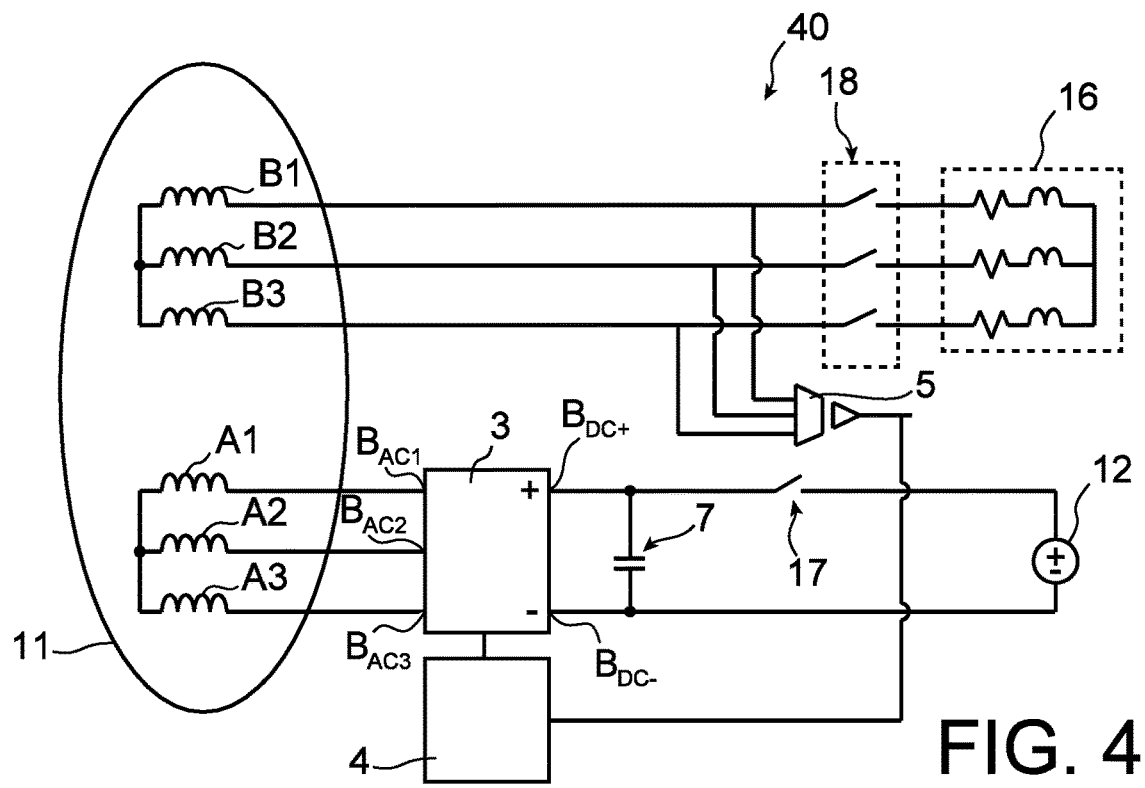

In the embodiments shown on FIGS. 3 and 4, the electrical source 12 is a DC source, for example a DC electrical network DC, particularly on onboard DC network.

In the embodiment shown on FIG. 3, the electrical load 15 is a DC load, for example a DC electrical network DC, particularly an onboard DC network. In this type of case, the starter-generator 30 also comprises a rectifier 9 arranged between at least one first stator winding B1, B2, B3 and the DC load 15. In one advantageous embodiment, the rectifier 9 is integrated into the asynchronous machine 11 and can thus make use of its cooling system.

When several sets of at least one second stator winding are used, each of these sets B11, B12, B13; B21, B22, B23 can be associated with a corresponding rectifier $9_1$; $9_2$ as shown on FIGS. 5 and 6.

In the embodiment shown on FIG. 4, the electrical load 16 is an AC load. Therefore, the rectifier is not necessary in this type of case. It is noted that the asynchronous machine is not known for producing a very pure sine curve, this can cause difficulties when the objective is to supply power to an onboard AC network. On the other hand, the solution given in FIG. 4 is perfectly adapted to AC loads 16 that accept some distortion, such as deicing resistances.

A comparison of FIGS. 3 and 4 with FIG. 2 show that with the invention there is no need to add a converter to adapt the voltage amplitude and to make the galvanic isolation, because these functions are already performed by the different windings provided on the machine stator.

As a result, the size of the inverter used for the invention can thus be minimised. The inverter is then sized for the most restrictive need; either for the need in motor mode, or for 25 to 30% of the need in generator mode (the reactive power is generally equal to 25 to 30% of the active power).

Furthermore, the efficiency in generator mode is optimal because there is only one AC to DC conversion stage, without a chopping converter.

Finally, the invention overcomes constraints related to connection points to the structure because galvanic isolation is achieved by the sets of windings located on the stator magnetic circuit. Consequently, a neutral contactor is found to be unnecessary.

Figure 5:
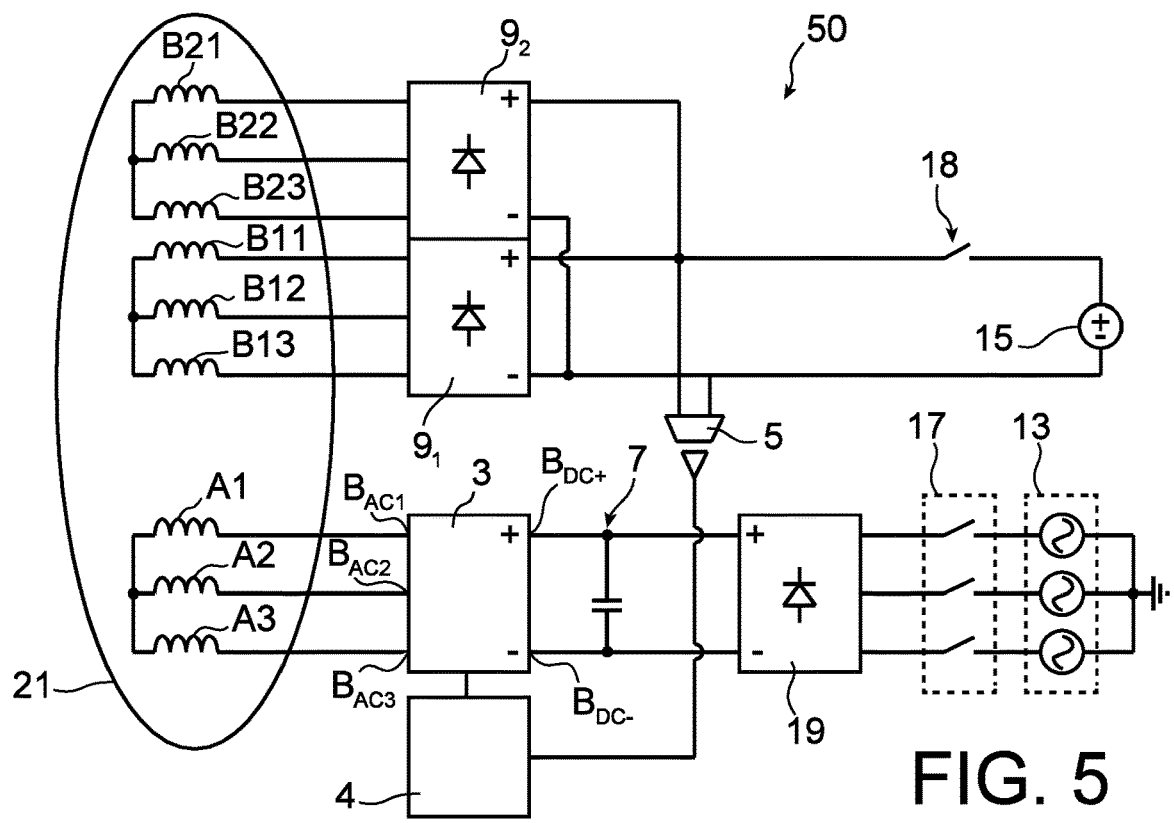

In the embodiments shown in FIGS. 3 and 4, the electric source 12 is a DC source, and on the other hand in the embodiment illustrated on FIG. 5 it is an AC source 13, particularly an onboard AC network, for example a 3*115 Vrms 400 Hz three-phase network. On FIG. 5, the load is a DC load, for example a 28 Vdc type onboard network. Since the source 13 is of the AC type, an AC-DC converter 19 is arranged between the internal DC bus 7 and the electrical source 13.

The three-phase starting network 13 is such that the neutral is connected to the structure, while the generation network 15 is such that the minus is connected to the structure. The stator magnetic circuit according to the invention makes the galvanic isolation between the low voltage part (3*115 Vac, 270 Vdc) and the very low voltage part (28 Vdc).

The at least one first stator winding presented herein has more turns than the at least one second stator winding because it is designed to work at higher voltage.

In motor mode, the second isolation contactor 17 is closed so as to supply power to the converter 19 that generates 270 Vdc on the internal bus 7. The three-phase inverter 3 uses this energy to induce AC currents in the at least one first stator winding A1, A2, A3, at an amplitude and a frequency that depend on the required torque. The second stator windings B11, B12, B13; B21, B22, B23 are not used. The first isolation contactor 18 remains open, so that the machine is not loaded with the 28 Vdc network.

In generator mode, the second isolation contactor 17 is open. When the starter-generator 50 has to change to generator mode, the internal DC bus 7 is loaded at a sufficient voltage amplitude for priming through a small auxiliary converter (not shown). The inverter 3 is then made to function to magnetise the machine 21. The auxiliary converter may then be deactivated. The control circuit 4 adjusts the magnetisation current to regulate the output voltage to the right amplitude, namely 28 Vdc in this example. As soon as the output voltage has stabilised, the first isolation contactor 18 can be closed such that the machine can supply power to the 28 Vdc onboard network 15.

Figure 6:
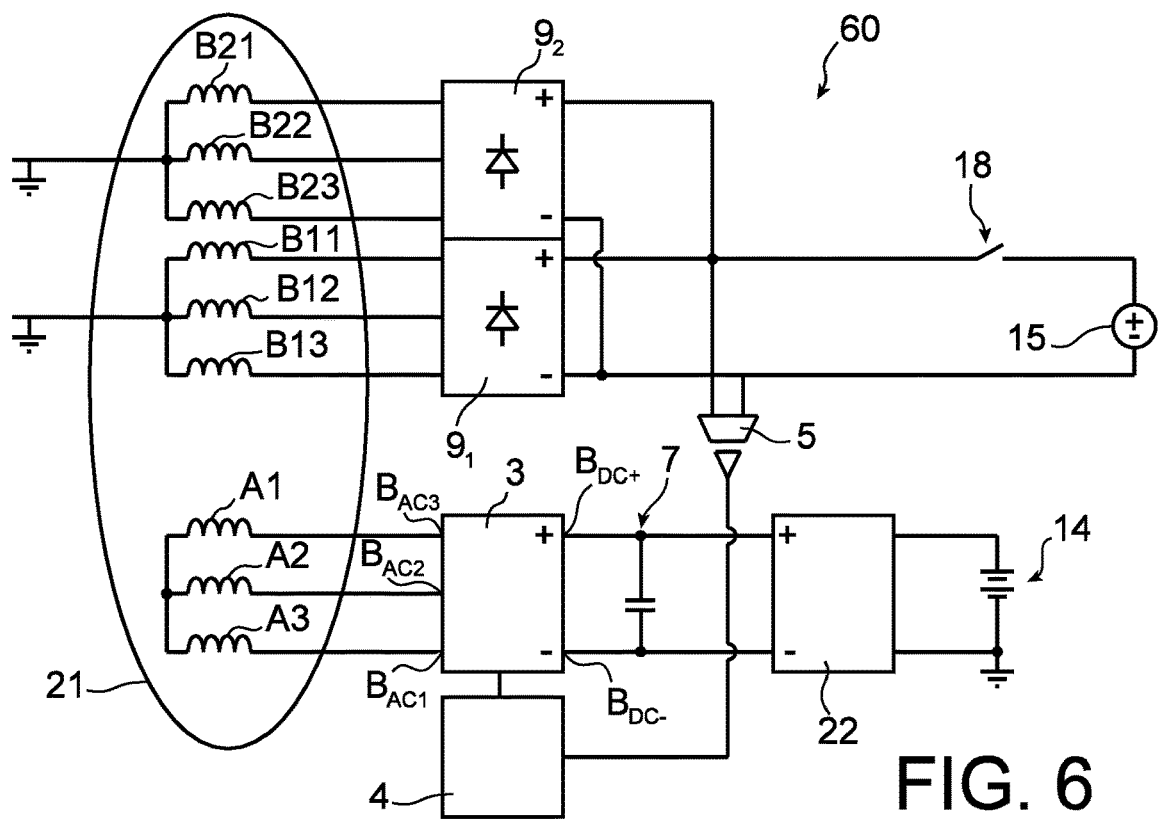

FIG. 6 shows another possible embodiment of a starter-generator 60 according to the invention in which the electrical starter source is a battery 14. One application of such an embodiment is an APU starter-generator. It must be possible to start the APU from a battery, generally a 24 Vdc battery. The required power level for this operation is generally between 4 and 10 kW mechanical. On the other hand, the power to be output in generation may be several tens of kW, at a voltage of 270 Vdc in one example embodiment.

The generation network 15 is such that the neutral of the machine 21 is connected to the structure. For the battery 14, the minus is connected to the structure. The stator magnetic circuit according to the invention makes the galvanic isolation between the low voltage part (3*115 Vac, 270 Vdc) and the very low voltage part (28 Vdc).

The at least one first stator winding presented herein has fewer turns than the at least one second stator winding because it is designed to work at lower voltage.

In one possible embodiment, a two-directional converter 22 can be arranged between the internal DC bus 7 and the battery 14 so that discharge of the battery can be controlled in motor mode and charging of the battery can be controlled through the at least one first stator winding A1, A2, A3.

In motor mode, the converter 22 is activated to supply power to the internal DC bus with the appropriate voltage amplitude. The inverter 3 uses this energy to induce AC currents in at least one first stator winding A1, A2, A3, at an amplitude and a frequency that depend on the required torque. The second stator windings B11, B12, B13; B21, B22, B23 are not used. The first isolation contactor 18 remains open in this mode, so that the machine is not loaded with the 270 Vdc network.

The change to generator mode, once the starting phase is complete, requires that the DC internal bus 7 is charged to a sufficient voltage amplitude for priming, through the converter 22. The inverter 3 is then made to function to magnetise the machine. The converter 22 may then be deactivated. The control circuit 4 adjusts the magnetisation current to regulate the output voltage to the right amplitude, namely 270 Vdc in this example. As soon as the output voltage has stabilised, the first contactor 18 can be closed such that the machine can supply power to the 270 Vdc onboard network 15.

The machine must be magnetised before the battery 14 can be recharged. This can be done using the operations described above to change to generator mode. Once magnetised, the machine 21 controlled by the inverter 3 supplies power to the DC bus 7 through the at least one first winding. The converter 22 uses energy from this DC bus to recharge the battery with precise control over the injected current profile. This battery recharging operation may or may not be done at the same time as the principal generation at 270 Vdc.

The invention is not limited to a starter-generator like that described above, but also includes a turbomachine equipped with such a starter-generator. The invention also covers the use disclosed above of the starter-generator according to the invention during the starting phase of a turbomachine and/or for the power supply to an electrical load after the starting phase of the turbomachine and/or to recharge a battery.

The invention claimed is:

1. A turbomachine starter-generator, comprising:
an asynchronous electric machine configured so as to operate in a motor mode during a starting phase of a turbomachine while being power supplied by an electrical source, and so as to operate in a generator mode after the starting phase of the turbomachine in order to supply power to an electrical load;
an inverter arranged between the electrical source and the asynchronous machine, the inverter having at least two AC terminals coupled to the asynchronous machine and at least two DC terminals coupled to a DC bus;
an inverter control unit configured such that the inverter outputs onto the at least two AC terminals a starting current in the motor mode and a magnetisation current in the generator mode; and
at least one first stator winding connected to the at least two AC terminals of the inverter in order to be supplied with the starting current in the motor mode and with the magnetisation current in generator mode, and at least one second stator winding connected to the electrical load in the generator mode,
wherein the inverter control unit is configured in the generator mode such that the inverter supplies the magnetisation current without being driven by said electrical source or another electrical source while being controlled from a voltage measurement at the electrical load and a voltage measurement on the DC bus, an amplitude and a frequency of the magnetisation current being controlled from the voltage measurement at the electrical load and the voltage measurement on the DC bus so as to balance active and reactive powers of the asynchronous electric machine.

2. The starter-generator according to claim 1, wherein the at least one second stator winding is disconnected from the electrical load in the motor mode.

3. The starter-generator according to claim 1, further comprising a converter between the inverter and the electrical source.

4. The starter-generator according to claim 3, wherein the electrical source is an AC source, and the converter is an AC-DC converter.

5. The starter-generator according to claim 3, wherein the converter is a two-directional converter and wherein the electrical source is a rechargeable source to which the asynchronous machine outputs energy through the at least one first stator winding in the generator mode.

6. The starter-generator according to claim 1, wherein the electrical load is an onboard electrical network.

7. The starter-generator according to claim 1, wherein the electrical load is a DC load and further comprising a rectifier arranged between the at least one second stator winding and the DC load.

8. The starter-generator according to claim 7, wherein the rectifier is integrated into the asynchronous machine.

9. The starter-generator according to claim 1, further comprising an auxiliary converter configured so as to load the DC bus in a priming phase of the generator mode and to be deactivated once the generator mode is established.

10. The starter-generator according to claim 1, wherein the at least one second stator winding comprises several sets of windings each comprising at least one stator winding, the sets being out of phase by an electrical angle.

11. The starter-generator according to claim 10, wherein the at least one second stator winding comprises two sets of three-phase stator windings out-of-phase by 30°.

12. The starter-generator according to claim 1, wherein the at least one first stator winding and the at least one second stator winding are three-phase windings.

13. The starter-generator according to claim 1, wherein the at least one first stator winding and the at least one second stator winding have a different number of turns.

14. The starter-generator according to claim 1, wherein the rotor of the asynchronous machine is of the squirrel cage type.

15. The starter-generator according to claim 1, further comprising an isolation contactor located between the inverter and the electrical source, said isolation contactor being capable of being controlled to disconnect the inverter from the electrical source in the generator mode.

16. A turbomachine comprising the starter-generator according to claim 1.

* * * * *